US010161372B2

(12) United States Patent
Mast et al.

(10) Patent No.: US 10,161,372 B2
(45) Date of Patent: Dec. 25, 2018

(54) HYDROSTATIC DRIVE

(71) Applicant: Robert Bosch GmbH, Stuttgart (DE)

(72) Inventors: Michael Mast, Schemmerhofen (DE);
Paul Luis Hernandez Ladera,
Elchingen (DE)

(73) Assignee: Robert Bosch GmbH, Stuttgart (DE)

( * ) Notice: Subject to any disclaimer, the term of this patent is extended or adjusted under 35 U.S.C. 154(b) by 106 days.

(21) Appl. No.: 15/507,633

(22) PCT Filed: Aug. 4, 2015

(86) PCT No.: PCT/EP2015/067919
§ 371 (c)(1),
(2) Date: Feb. 28, 2017

(87) PCT Pub. No.: WO2016/041685
PCT Pub. Date: Mar. 24, 2016

(65) Prior Publication Data
US 2017/0254308 A1    Sep. 7, 2017

(30) Foreign Application Priority Data

Sep. 15, 2014 (DE) .......................... 10 2014 218 419

(51) Int. Cl.
*F15B 21/08* (2006.01)
*F02N 7/08* (2006.01)
(Continued)

(52) U.S. Cl.
CPC .................. *F02N 7/08* (2013.01); *B60K 6/12* (2013.01); *E02F 9/226* (2013.01); *E02F 9/2217* (2013.01);
(Continued)

(58) Field of Classification Search
CPC .......... F15B 21/14; F15B 1/024; F15B 1/033; F15B 11/161; F15B 11/003; F15B 11/024;
(Continued)

(56) References Cited

U.S. PATENT DOCUMENTS 5,787,710 A * 8/1998 Baeuerle ............... F16D 48/066
192/12 C
8,220,256 B2 * 7/2012 Mueller .................. B60K 6/12
60/414

(Continued)

FOREIGN PATENT DOCUMENTS

DE   10 2005 027 940 A1   1/2006
EP       2 570 381 A1   3/2013
(Continued)

OTHER PUBLICATIONS

International Search Report corresponding to PCT Application No. PCT/EP2015/067919, dated Oct. 28, 2015 (German and English language document) (7 pages).

*Primary Examiner* — Mark Laurenzi
*Assistant Examiner* — Shafiq Mian
(74) *Attorney, Agent, or Firm* — Maginot, Moore & Beck LLP

(57) ABSTRACT

A hydrostatic drive includes a hydraulic machine, a hydraulic adjusting device, a high-pressure accumulator, an accumulator-closing valve, and an electronic control unit. The hydraulic machine has a swept volume that is adjustable via the hydraulic adjusting device from a maximum positive swept volume to a maximum negative swept volume via a zero swept volume. The hydraulic machine is operated as a pump with positive swept volume and as a motor with negative swept volume. The high-pressure accumulator supplies the hydraulic machine with pressure medium for operation as a motor via a pressure line. The accumulator- (Continued)

closing valve has a first position and a second position and is arranged in the pressure line. A fluidic connection from the high-pressure accumulator to the hydraulic machine is open in the first position and closed in the second position. The accumulator-closing valve is actuated in accordance with signals from the electronic control unit.

12 Claims, 1 Drawing Sheet

(51) Int. Cl.
  *B60K 6/12* (2006.01)
  *E02F 9/22* (2006.01)
  *F15B 1/033* (2006.01)
  *F15B 11/16* (2006.01)
(52) U.S. Cl.
  CPC .......... *E02F 9/2246* (2013.01); *E02F 9/2292* (2013.01); *E02F 9/2296* (2013.01); *F15B 1/033* (2013.01); *F15B 11/165* (2013.01); B60K 2006/126 (2013.01); B60Y 2400/46 (2013.01); F15B 2211/20523 (2013.01); F15B 2211/20553 (2013.01); F15B 2211/20569 (2013.01); F15B 2211/212 (2013.01); F15B 2211/4053 (2013.01); F15B 2211/411 (2013.01); F15B 2211/41509 (2013.01); F15B 2211/50518 (2013.01); F15B 2211/5157 (2013.01); F15B 2211/526 (2013.01); F15B 2211/6051 (2013.01); F15B 2211/625 (2013.01); F15B 2211/6306 (2013.01); F15B 2211/6313 (2013.01); F15B 2211/6343 (2013.01); *F15B 2211/665* (2013.01); F15B 2211/6651 (2013.01); F15B 2211/6652 (2013.01)

(58) Field of Classification Search
  CPC ... F15B 11/0423; E02F 9/2267; E02F 9/2275; E02F 9/2232
  See application file for complete search history.

(56) References Cited

U.S. PATENT DOCUMENTS

| | | | | |
|---|---|---|---|---|
| 8,585,524 | B2* | 11/2013 | Mueller | B60K 6/12 |
| | | | | 475/72 |
| 9,482,246 | B2* | 11/2016 | Geissler | B60K 11/00 |
| 2004/0103656 | A1 | 6/2004 | Frazer et al. | |
| 2008/0276606 | A1* | 11/2008 | Petre | B60K 6/12 |
| | | | | 60/413 |
| 2010/0069193 | A1* | 3/2010 | Mueller | B60K 6/12 |
| | | | | 475/78 |
| 2010/0293294 | A1* | 11/2010 | Hilt | H04L 67/104 |
| | | | | 709/241 |
| 2011/0302913 | A1* | 12/2011 | Mueller | B60K 6/12 |
| | | | | 60/413 |
| 2012/0060777 | A1* | 3/2012 | Tikkanen | F01P 7/044 |
| | | | | 123/41.11 |
| 2012/0204627 | A1 | 8/2012 | Anderl et al. | |
| 2013/0098464 | A1* | 4/2013 | Knussman | E02F 9/2235 |
| | | | | 137/12 |

FOREIGN PATENT DOCUMENTS

| | | |
|---|---|---|
| FR | 2 973 078 A1 | 9/2012 |
| WO | 2012/125798 A1 | 9/2012 |

\* cited by examiner

HYDROSTATIC DRIVE

This application is a 35 U.S.C. § 371 National Stage Application of PCT/EP 2015/067919, filed on Aug. 4, 2015, which claims the benefit of priority to Ser. No. DE 10 2014 218 419.3, filed on Sep. 15, 2014 in Germany, the disclosures of which are incorporated herein by reference in their entirety.

BACKGROUND

The disclosure relates to a hydrostatic drive which is provided in particular for starting an internal combustion engine, in particular a diesel engine.

WO 2012/125798 A1 has disclosed a hydrostatic drive which has a hydraulic machine which, during operation as a hydraulic motor, can start an internal combustion engine, and during operation as a pump, can charge a hydropneumatic high-pressure accumulator and supply pressure medium to further hydraulic consumers.

The hydraulic machine is adjustable in terms of its swept volume from a maximum positive swept volume via a swept volume of zero to a maximum negative swept volume by means of a hydraulic adjustment device, wherein pump operation is possible in the case of a positive swept volume and motor operation is possible in the case of negative swept volume. Here, the swept volume is the quantity of pressure medium that is delivered or taken in by the hydraulic machine per revolution of a driveshaft. The hydraulic machine can, for operation as a hydraulic motor, be supplied with pressure medium via a pressure line which runs between a pressure port of the hydraulic machine and the high-pressure accumulator. An accumulator shut-off valve with a first position and a second position is arranged in the pressure line, wherein a fluidic connection from the high-pressure accumulator to the hydraulic machine is open in the first position and is shut off in the second position. The accumulator shut-off valve is actuable as a function of the signals of an electronic control unit.

A hydraulic adjustment device for the swept volume of a hydrostatic machine conventionally has one or more adjustment pistons, which are adjoined by adjustment chambers, and at least one restoring spring, under the action of which the hydraulic machine is set to a predetermined swept volume when a pressurization of the adjustment chambers is ended.

The disclosure is based on the object of providing a hydrostatic drive for starting an internal combustion engine, in the case of which the hydraulic machine can be adjusted out of the adjustment range with a negative swept volume quickly and without excessive load being placed on the components.

SUMMARY

Said object is achieved by means of a hydrostatic drive which has the features of the disclosure.

In the case of a hydrostatic drive according to the disclosure, in the event of an adjustment of the hydraulic machine from a negative swept volume to a positive swept volume, the electronic control unit transmits a signal for switching the accumulator shut-off valve from the first position into the second position at such a time that the accumulator shut-off valve switches into the second position only in the presence of a swept volume of zero or a positive swept volume of the hydraulic machine. In this way, it is ensured that, during the time taken for the adjustment from the maximum negative swept volume to the swept volume of zero, a fluidic connection still exists from the pressure port of the hydraulic machine to the high-pressure accumulator. It is thereby ensured that the hydraulic machine does not evacuate the pressure line, and thus that no cavitation occurs, which could lead to damage of components. Depending on the type of adjustment device, it is then also possible for the pressure in the pressure line to be utilized for pressurizing an adjustment chamber, the pressurization of which acts in the sense of an adjustment from a negative swept volume in the direction of a swept volume of zero, such that not only the force of a restoring spring of the adjustment device but also a pressure force can be utilized for the restoring movement of the hydraulic machine out of the range with negative swept volume.

Advantageous refinements of the disclosure emerge from the dependent patent claims.

Adjustable hydraulic machines are known which have an adjustment device which comprises a first adjustment chamber, which adjoins a first adjustment piston and for which an inflow, which effects an adjustment in the direction of maximum negative swept volume, and an outflow of pressure medium are controllable by means of a valve arrangement, a second adjustment chamber, which adjoins a second adjustment piston and which is permanently fluidically connected to the pressure line and which is decreased in size in the event of an adjustment in the direction of maximum negative swept volume and is increased in size in the event of an adjustment in the direction of maximum positive swept volume, and a restoring spring, which acts in the direction of maximum positive swept volume. A hydraulic machine of said type is set to the maximum positive swept volume when the adjustment chambers are relieved of pressure. By means of an inflow of pressure medium into the adjustment chamber which adjoins the first adjustment piston, the active surface of which is larger than the active surface of the second adjustment piston, the hydraulic machine can be adjusted from the maximum positive swept volume via a swept volume of zero to a maximum negative swept volume. Here, the pressure prevailing in the pressure line always prevails in the second adjustment chamber, such that, if a pressure in the pressure line is maintained during the restoring movement of the hydraulic machine out of motor operation, a pressure force contributes to the restoring movement without further control by means of a valve.

The valve arrangement for controlling the inflow into and the outflow of pressure medium out of the first adjustment chamber preferably comprises a control valve by means of which, for an adjustment to negative swept volume, the first adjustment chamber can be supplied with pressure medium from a pressure medium source, in particular from the high-pressure accumulator, independently of the working port of the hydraulic machine.

For the operation of the hydraulic machine as a pump, the valve arrangement comprises a hydraulic regulating unit which is provided in addition to the control valve. For the interaction with the hydraulic regulating unit and with the high-pressure accumulator, the control valve is a 3/2-way valve with a first port, which is fluidically connected to an adjustment pressure outlet of the hydraulic regulating unit, with a second port, which is fluidically connected to the pressure medium source, and with a third port, which is connected to the first adjustment chamber, and wherein the control valve has a first position, in which the outlet is fluidically connected to the first inlet and the second inlet is shut off, and a second position, in which the outlet is connected to the second inlet and the first inlet is shut off.

Thus, in the first position of the control valve, the hydraulic regulating unit is capable of influencing the swept volume of the hydraulic machine, whereas said hydraulic regulating unit is inactive in the second position of the control valve.

In particular, the hydraulic regulating unit is a load sensing (LS) regulating valve which is acted on, in the sense of a pressure medium inflow into the first adjustment chamber of the adjustment device, by the pressure in the pressure line, and in the sense of a pressure medium outflow out of the first adjustment chamber, by a regulating spring and an LS control pressure which prevails at an LS port (X), and wherein an LS control pressure is transmitted to the LS port of the load sensing (LS) regulating valve when the swept volume of the hydraulic machine is still negative. Through corresponding selection of the LS control pressure, at least of the LS control pressure signal, which predefines the LS control pressure, it can be achieved that the hydraulic machine is adjusted out of the range of negative swept volume quickly but not as far as the maximum positive swept volume. In this way, it is achieved that, after starting, the internal combustion engine is not unduly subjected to load by the hydraulic machine, and can run up to the idle rotational speed quickly.

The load sensing (LS) regulating valve is advantageously acted on with an LS control pressure already while the control valve is still situated in its second position. For as long as the control valve is still situated in its second position, the exertion of load on the LS regulating valve remains without influence, because its control outlet is not connected to the first adjustment chamber. The LS control pressure is preferably even made to track the accumulator pressure for as long as the control valve is in its second position. At the moment of switching of the control valve, a suitable LS control pressure then prevails already without the need for a control line to be filled or for a movable control body of a valve to travel a large distance.

The LS control pressure is advantageously lower, approximately by the pressure equivalent of the regulating spring, than the pressure in the pressure line when the hydraulic machine reaches the swept volume of zero when pivoting back from the maximum negative swept volume, such that the hydraulic machine is adjusted beyond the swept volume of zero but not as far as the maximum positive swept volume. Deviations of the LS control pressure from the exact value defined by the difference between the pressure in the pressure line and the pressure equivalent of the regulating spring are compensated in the case of a swept volume which deviates only slightly from the swept volume of zero, especially since, after the swept volume crosses zero, the hydraulic accumulator is separated from the hydraulic machine and only the pressure in the pressure line, which has a small hydraulic capacity, has to be varied.

It is preferably the case that an LS control pressure is transmitted to the LS port of the load sensing (LS) regulating valve when the control valve is still situated in its second position, wherein the LS control pressure initially follows the falling accumulator pressure with a fixed pressure difference below the pressure in the high-pressure accumulator, and wherein at least the LS control pressure signal, which predefines the LS control pressure, is held constant when the control valve is switched from its second position into its first position. Here, a situation may arise in which the LS control pressure does not correspond to the value predefined by the LS control pressure signal, because the LS control pressure signal is derived from the accumulator pressure, and the pressure at that point of the fluid path between the high-pressure accumulator and the hydraulic machine at which the control oil for generating the LS control pressure is extracted is lower, owing to the pressure losses between the high-pressure accumulator and the hydraulic machine owing to the fluid flow, than the desired LS control pressure. The present LS control pressure however cannot be higher than the pressure from which it is generated. Thus, the LS control pressure decreases further with the pressure in the fluid path even though the LS control pressure signal is held constant. If, at the moment of switching of the control valve, the present LS control pressure is equal to, or lower by less than the pressure equivalent of the regulating spring, than the pressure which acts on the LS regulating valve in the opposite direction, said LS regulating valve is situated in a position in which the first adjustment chamber is connected to a tank. The hydraulic machine is then adjusted very quickly from the range of negative swept volume in the direction of a swept volume of zero. If, owing to particular circumstances at the moment of switching of the control valve, the present LS control pressure is lower by more than the pressure equivalent of the regulating spring than the pressure which acts on the LS regulating valve in the opposite direction, said LS regulating valve is initially still situated in a position in which the first adjustment chamber is connected to the pressure line. The hydraulic machine then remains in motor operation for slightly longer. The pressure in the pressure line and in the high-pressure regulator falls, such that the LS regulating valve passes into the position in which the first adjustment chamber is relieved of pressure to the tank.

It has been found that the hydraulic machine pivots back quickly, and does not pivot out to large positive swept volumes, if the fixed difference between the accumulator pressure and the LS control pressure signal is approximately 1.75 times the pressure equivalent of the regulating spring of the LS regulating valve.

It is possible to control the hydrostatic drive system in a manner dependent only on the rotational speed of the hydraulic machine and on the pressure in the high-pressure regulator, which is detected by means of a pressure sensor.

More precise control and a faster restoring action would appear to be possible if the hydraulic machine is equipped with a sensor for the swept volume, and if, after the switching of the control valve from the second position into the first position, the level of the LS control pressure, at least of the LS control pressure signal, is determined in a manner dependent on the accumulator pressure and on the magnitude of the negative swept volume or of the change in the negative swept volume.

If a sensor for the swept volume is provided, it is thus possible, after the switching of the control valve from the second position into the first position, that is to say after the end of the starting process, for the accumulator shut-off valve to be switched from the first position into the second position in a manner dependent on the magnitude of the detected swept volume.

BRIEF DESCRIPTION OF THE DRAWINGS

An exemplary embodiment of a hydrostatic drive according to the disclosure is illustrated in the drawing. The disclosure will now be discussed in more detail on the basis of the single figure of said drawing.

DETAILED DESCRIPTION

Figure 1:
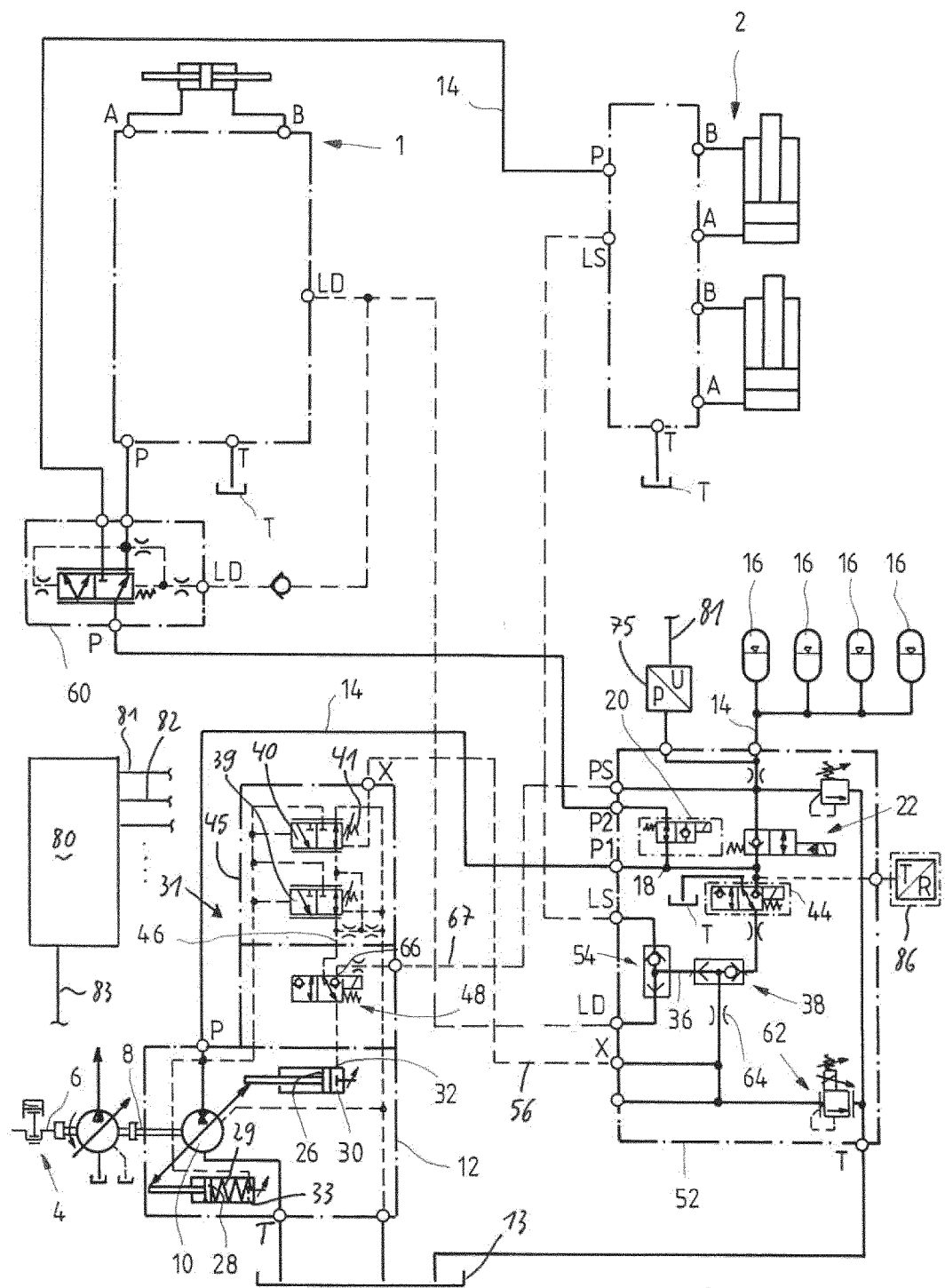
FIG. 1 shows a circuit diagram of the exemplary embodiment.

The hydrostatic drive illustrated as a circuit diagram in FIG. 1 serves not only for the starting of a diesel engine but also for the steering, and for the actuation of equipment, of a mobile working machine, and said hydrostatic drive comprises a hydrostatic steering system 1 and further hydraulic consumers 2. The drive is used in combination with a diesel engine 4, the rotational speed of which is detected by means of a rotational speed sensor (not illustrated in any more detail) and the crankshaft 6 of which is coupled to a drive shaft 8 of a hydraulic machine 10, which hydraulic machine is adjustable in terms of its swept volume between positive swept volumes and negative swept volumes via a swept volume of zero and is in the form of an axial piston machine of swashplate type of construction. The swashplate is in this case the stroke control element which, by means of its position, determines the swept volume of the hydraulic machine between a maximum positive swept volume and a maximum negative swept volume. An axial piston machine of said type is also referred to as a fully pivotable axial piston machine. The housing 12 thereof has a tank port T and a pressure port P, wherein said two ports T and P are permanently and uniquely assigned to high-pressure and to tank pressure. The full pivotability makes it possible for the hydraulic machine 10, while maintaining the direction of rotation, to be operated in the case of positive swept volumes in a pump mode, in which it draws pressure medium out of a tank 13 via the tank port T and discharges said pressure medium into the pressure port P, and in the case of negative swept volumes in a motor mode, in which pressure medium flows to the pressure port P from a pressure medium source, which pressure medium flows via the tank port T into the tank 13.

The pressure port P is connected via a branched pressure line 14 to the steering system 1, to the further consumers 2 and to a high-pressure accumulator 16. For this purpose, the pressure line 14 has a branching point 18. Below, reference will always be made in each case to one high-pressure accumulator, even if, as shown, multiple high-pressure accumulators are connected in parallel with respect to one another.

Between the branching point 18 on the one hand and the steering system 1 and the further consumers 2 on the other hand, there is provided a consumer shut-off valve 20 which is in the form of a 2/2-way switching valve. Said valve, in a main position into which it is preloaded by a spring, connects the steering system 1 and the further consumers 2 to the pressure port of the hydraulic machine 10 and to the high-pressure accumulator 16, whereas, in an actuated switched position, said valve connects the pressure line 14 to the steering system 1 and to the consumers 2.

The pressure at the pressure port P will hereinafter be referred to as pump pressure. Even if the connection between the hydraulic machine and the high-pressure accumulator is open, it may deviate from the accumulator pressure owing to flow losses.

An accumulator shut-off valve 22 is provided in the pressure line 14 between the branching point 18 and the high-pressure accumulator 16, which accumulator shut-off valve, in a main position into which it is preloaded by a spring, imparts a blocking action in a flow direction from the high-pressure accumulator 16 to the branching point 18 and the hydraulic machine 10, and which accumulator shut-off valve, in an actuated switched position, opens the fluidic connection between the high-pressure accumulator 16 and the hydraulic machine 10. A flow of pressure medium from the hydraulic machine 10 to the high-pressure accumulator 16 is possible when the accumulator shut-off valve 22 is in the main position.

The hydraulic machine 10, which is in the form of a fully pivotable axial piston machine, has an adjustment device which substantially has a first adjustment piston 26, which acts counter to a second adjustment piston 28 and a restoring spring 29. The active surface of the first adjustment piston 26 is larger than the active surface of the second adjustment piston 28. The adjustment piston 26 delimits an adjustment chamber 30. In a manner controlled by means of a valve arrangement 31, pressure medium can be supplied to the adjustment chamber 30 and discharged from the adjustment chamber 30 via a chamber port 32. The second adjustment piston 28 delimits an adjustment chamber 33 which, within the housing 12, is permanently fluidically connected to the pressure port P. When the hydraulic machine is at a standstill, the pressures in the adjustment chamber 30 and in the pressure line 14 are dissipated relatively quickly as a result of leakage, such that the hydraulic machine is set to the maximum positive swept volume by means of the restoring spring 29. During filling of the adjustment chamber 30, the hydraulic machine 10 is pivoted back from maximum positive swept volume to smaller positive swept volumes. During further filling of the adjustment chamber 30, the hydraulic machine 10 is pivoted beyond a swept volume of zero and accordingly to negative swept volumes, as far as a maximum negative swept volume.

The valve arrangement 31 comprises three 3/2-way proportional valves, specifically a load sensing regulating valve (LS regulating valve) 40, a pressure regulating valve 39, which together with the LS regulating valve 40 is also hereinafter referred to as pressure delivery flow regulator, denoted by the reference designation 45, and which is set to a pressure which lies above the normally occurring load pressures and above the maximum load pressure of the high-pressure accumulator 16, and a control valve 48 in the form of a switching valve. The pressure regulating valve 39 has a first port, which is connectable via a relief line to the tank 13. A second port of the pressure regulating valve 39 connects to the pressure port P. The third port, which is connectable to the first port or to the second port, is connectable by means of an adjustment-chamber-side port 46 of the pressure delivery flow regulator 45 to the adjustment chamber 30 on the adjustment piston 26. A first port of the LS regulating valve 40 connects to the relief line, and a second port connects to the pressure port P. The third port of the LS regulating valve 40 is connectable to the first or second port thereof, and is permanently connected to the first port of the pressure regulating valve 39. A slide (not illustrated in any more detail) of the pressure regulating valve 39 is acted on, in the sense of a connection of the adjustment chamber 30 to the third port of the LS regulating valve, by a compression spring and, in the sense of a connection of the adjustment chamber to the pressure port P, by the pump pressure. A slide (not illustrated in any more detail) of the LS regulating valve 40 is acted on, in the sense of a connection of the third port to the first port and thus to the relief line, by a regulating spring 41 and by the LS pressure prevailing at the LS port X, and in the sense of a connection of the third port to the second port and thus to the pressure port P. Force equilibrium prevails at the slide of the valve 40 if, between the pump pressure and the LS pressure, a difference exists which corresponds to the force of the regulating spring 41. Normally, the difference lies between 10 bar and 25 bar. Said difference is also referred to as the pressure equivalent of the regulating spring or as the pump-$\Delta$p. In the present case, the pump-$\Delta$p may be 22 bar.

The LS pressure is the highest load pressure of simultaneously actuated consumers 1 and 2 or a predefined LS control pressure. The highest load pressure of the consumers 1 and 2 is picked off by means of a shuttle valve chain with the shuttle valve 54 as the final chain element, and is signaled to said consumers in a common LS signaling line 36. The selection of the highest pressure between the highest load pressure of the hydraulic consumers 1 and 2 and the predefined LS control pressure is realized by means of a shuttle valve 38, at the first inlet of which the highest load pressure of the consumers 1 and 2 prevails, the second inlet of which is connectable by means of an LS valve 44 to the pressure line 14, and the outlet of which is connected to the LS port X on the pressure delivery flow regulator 45. A nozzle is arranged between the second inlet of the first shuttle valve 38 and the LS valve 44. Said nozzle may also be omitted.

In a main position of the LS valve 44, in which the latter is preloaded by means of a spring, the second inlet of the shuttle valve 38 is shut off with respect to the pressure line 14 and is connected to the tank. Through energization of an electromagnet which imparts a pulling action, the LS valve 44 passes into a switched position in which the pressure of the pump line 14 is transmitted to the second inlet of the shuttle valve 38 and, if said pressure is higher than the pressure at the first inlet of the shuttle valve 38, to the outlet of said shuttle valve.

A nozzle 64 is incorporated into an LS signaling line 56 which leads from the outlet of the shuttle valve 38 to the LS port X of the pressure delivery flow regulator 45. A proportionally adjustable pressure-limiting valve 62 is connected to the LS signaling line 56 between said nozzle and the LS port X of the pressure delivery flow regulator 45, the outlet of which valve is connected to the tank. The pressure setting of the pressure-limiting valve is continuously variable between a minimum value and a maximum value of, for example, 300 bar by means of a proportional electromagnet. The pressure-limiting valve 62 is one with a falling characteristic curve, that is to say the pressure setting value decreases with increasing energization of the electromagnet. With the aid of the nozzle 64 and the pressure-limiting valve 62, an LS control pressure can be generated in the LS signaling line from the pump pressure prevailing in the pressure line 14, which LS control pressure is lower than the pump pressure.

The control valve is incorporated structurally between the pressure delivery flow regulator 45 and the housing 12 of the hydraulic machine 10. Said control valve has a first port 66 which is connected via a line 67 to a section of the pump line 14 which connects the accumulator shut-off valve 22 to the high-pressure accumulator 16. A second port of the control valve 48 is connected to the adjustment-chamber-side port 46 of the pressure delivery flow regulator 45. A third port of the 3/2-way valve is connected to the chamber port 32 of the adjustment chamber 30.

In a main position of the control valve 48, in which the latter is preloaded by means of a spring, the port 66 of the control valve 48 is shut off. The port 46 of the pressure delivery flow regulator 45 is connected by means of the control valve 48 to the chamber port 32, such that the pressure delivery flow regulator 45 can regulate the hydraulic machine 10. By virtue of the control valve 48 being switched into its switched position, which is effected by means of an electromagnet which imparts a pulling action, the second port and thus port 46 of the pressure delivery flow regulator 45 are shut off, and the high-pressure accumulator 16 is connected to the chamber port 32.

The valves 20, 22, 38, 44, 54, 62 and 64 are combined to form a start-stop valve block 52. Also seated on said valve block 52 are a pressure sensor 75, by means of which the accumulator pressure prevailing in the high-pressure accumulator 16 is detected, and a temperature sensor 76, by means of which the temperature of the pressure medium is detected.

The stop function of the diesel engine 4 and the start function of the hydrostatic drive are controlled by means of an electronic control unit 80 which is connected by means of an electrical line 81 to the pressure sensor 75, by means of an electrical line 82 to the electromagnet of the pressure-limiting valve 62, by means of a multiplicity of lines 83 to electrical components on the diesel engine 4, and by means of further electrical lines to the electromagnetically actuable valves 20, 22, 44 and 48, and to various further sensors.

When the diesel engine is running, the valves 20, 22, 44 and 66 assume the positions shown in the drawing. The consumer shut-off valve 20 thus permits a supply of pressure medium to the hydraulic consumers 1 and 2. The LS valve relieves the second inlet of the shuttle valve 38 to the tank, such that the highest load pressure of the actuated hydraulic consumers 1 and 2 prevails at the outlet of the shuttle valve and thus at the LS port X of the pressure delivery flow regulator 45. The electromagnet of the pressure-limiting valve 62 is energized such that the pressure-limiting valve is set to approximately 210 bar. Thus, for the operation of the hydraulic consumers 1 and 2 with load sensing regulation, the pressure-limiting valve 62 limits the LS control pressure to approximately 210 bar, and the pump pressure, which is higher by the pump-$\Delta p$ of 22 bar, to approximately 230 bar. The so-called pressure cut-off for the operation of the hydraulic consumers 1 and 2 with load sensing regulation is thus realized by means of the pressure-limiting valve 62. The control valve connects the adjustment-chamber-side port 46 of the pressure delivery flow regulator 45 to the adjustment chamber 30. It is thus altogether possible, in a known manner, for the hydraulic consumers 1 and 2 to be supplied with pressure medium in accordance with load sensing regulation with limitation of the pump pressure by means of the pressure-limiting valve 62. The high-pressure accumulator is charged by means of the accumulator shut-off valve 22, and the check valve function thereof, to the highest pump pressure that occurs during the actuation of the hydraulic consumers.

Said highest occurring pump pressure is however lower, owing to the pressure limitation for the consumers by means of so-called secondary pressure-limiting valves, than the accumulator pressure required for starting of the diesel engine. Therefore, if a situation is detected in which a deactivation (stoppage) of the diesel engine would appear to be advisable a situation in which, although neither of the two hydraulic consumers 1 and 2 is actuated, the diesel engine should however not be deactivated for other reasons, the consumer shut-off valve 20 is firstly closed, and then the high-pressure accumulator is charged to the desired charge pressure. For this purpose, the LS valve 44 is placed into the switching position in which the second inlet of the shuttle valve 38 is connected to the pressure line 14. The pressure-limiting valve 62 is, by means of corresponding energization of the associated electromagnet by means of the electronic control unit 80, set to a pressure value which is lower, by the pump-$\Delta p$, than the accumulator pressure detected by the pressure sensor 75 and signaled to the control unit 80. Owing to the nozzle 64, the pressure set at the pressure-limiting valve then prevails at the LS port X of the pressure delivery flow regulator 45. Proceeding from the initial pressure value, the set pressure at the pressure-limiting valve 62 is gradually increased by way of a ramped reduction of the current flowing through the electromagnet. By way of the degree of change of the set pressure with respect to time, it is possible by way of the LS regulating valve to set a volume flow, with which the high-pressure accumulator 16 is charged, of the hydraulic machine 10 which operates as a pump. For example, if the desired accumulator pressure is 292 bar, the pressure setting value of the pressure-limiting valve 62 is increased no further when 270 bar has been reached there. The LS valve 44 is placed into its rest position again, and the pressure-limiting valve 62 can be briefly energized to the maximum extent in order to accelerate the pressure dissipation in the LS signaling line 56 by way of the dissipation via internal leakages or via a nozzle (not shown in FIG. 1) or a flow regulating valve to the tank.

If the diesel engine is not then deactivated, the hydraulic machine 10 is set, in the pump mode, such that only the standby pressure of 22 bar, which is equal to the pump-$\Delta p$, is maintained in the pressure line 14. If the diesel engine is deactivated, the hydraulic machine 10 is self-evidently also rendered non-operational, and is adjusted to the maximum positive swept volume by the restoring spring 29. The high-pressure accumulator 16 is charged to the maximum accumulator pressure, for example 292 bar.

If the diesel engine is to be started again, firstly only the consumer shut-off valve 20 and the control valve 48 are actuated. The latter is placed into the position in which the adjustment chamber 30 is connected via the control valve 48 and the line 67 to the hydraulic accumulator 16. The adjustment chamber 30 is thus charged with the accumulator pressure, such that the hydraulic machine is adjusted from the maximum positive swept volume to the maximum negative swept volume via a swept volume of zero. Here, the force generated on the adjustment piston 26 by the accumulator pressure only has to act counter to the force of the restoring spring 29, because the tank pressure prevailing at the pressure port P of the hydraulic machine 10 prevails in the adjustment chamber 33. The adjustment is thus particularly fast.

Only when the hydraulic machine 10 has reached negative swept volume and it is thus ensured that it cannot, in a motor mode, impart a torque counter to the normal direction of rotation of the internal combustion engine 4, in particular when the hydraulic machine is at maximum negative swept volume, is the accumulator shut-off valve 22 placed into the position in which a pressure medium flow from the hydraulic accumulator 16 to the pressure port P of the hydraulic machine 10 is possible. If the hydraulic machine is equipped with a position sensor by way of which the swept volume is detected, the accumulator shut-off valve 22 can be switched in a manner dependent on the signal of the position sensor. Otherwise, it is switched a certain period of time after the control valve 48, by way of which it is ensured that a negative swept volume, in particular the maximum negative swept volume, has been reached. By way of the consumer shut-off valve 20 which is in its shut-off position, it is ensured that neither of the hydraulic consumers 1 and 2 is inadvertently moved.

After the opening of the accumulator shut-off valve 44, the hydraulic machine 10, as hydraulic motor, begins to drive the internal combustion engine. Shortly after the switching of the accumulator shut-off valve 44, the pressure-limiting valve 62 is actuated by the control unit 50 such that the pressure to which that pressure-limiting valve is set lies below the accumulator pressure detected by the pressure sensor 75 by a fixed pressure difference, in the present case for example by 35 bar. The pressure difference is thus approximately 1.6 times the pump-$\Delta p$. Since the accumulator pressure falls as a result of the extraction of the pressure medium flowing via the hydraulic machine, the pressure set at the pressure-limiting valve 62 is also continuously lowered. It is pointed out here that the pressure in the line section between the accumulator shut-off valve 22 and the hydraulic machine 10 is lower, owing to the pressure drop across the accumulator shut-off valve 22 and a nozzle possibly installed between the accumulator shut-off valve and the hydraulic accumulator, than the accumulator pressure, and that the pressure drop increases with increasing rotational speed of the internal combustion engine and thus of the hydraulic machine, because the pressure medium flow rate flowing via the accumulator shut-off valve increases. The pressure difference between the accumulator pressure and the pressure set at the pressure-limiting valve is now selected such that the force exerted on the LS regulating valve by the pressure prevailing at the pressure port P of the hydraulic machine 10 is lower than the sum of the force exerted by the LS control pressure and the force of the regulating spring 41. The LS regulating valve 40 is thus situated in the position shown in the FIGURE, in which the port 46 is relieved of pressure to the tank.

As soon as the internal combustion engine reaches the starting rotational speed, for example 400 revolutions per minute, from which it runs up to the idle rotational speed without further drive action, the control valve 48 is placed into its main position again, and thus the adjustment chamber 30 is separated from the hydraulic accumulator 16 and connected to the port 46 of the pressure delivery flow regulator 45. Likewise, from this point in time, the pressure value to which the pressure-limiting valve 62 is presently set is no longer varied. Since the hydraulic machine 10 initially still has a negative swept volume, the pressure at the high-pressure port P remains lower than the accumulator pressure. Furthermore, the accumulator pressure and initially also the pump pressure fall further. Here, if the LS control pressure falls below the value set and kept constant at the pressure-limiting valve 62 because the pressure at the inlet of the LS valve 44 becomes lower than the pressure set at the pressure-limiting valve 62, this continues to have no influence on the setting of the LS regulating valve 40, because although the two pressures prevailing at said valve may now be approximately equal, the setting of the valve is however maintained under the action of the regulating spring 41.

After the control valve 48 has been placed into its main position, the adjustment chamber 30 is thus relieved of pressure via the control valve 48 and the LS regulating valve 40 to the tank, and the pivoting-back process of the hydraulic machine can immediately begin. The pressure prevailing at the pressure port P acts, in the adjustment chamber 33, on the adjustment piston 28. Said pressure interacts with the restoring spring 29 in the direction of an adjustment of the stroke control element in the direction of a swept volume of zero. Because the total acting restoring force is very high, the acceleration of the stroke control element is high, such that the restoring action occurs with high dynamics.

After a time interval after the control valve 48 has returned into its main position, by way of which it is ensured that the hydraulic machine 10 has been adjusted to a positive swept volume, the accumulator shut-off valve 22 is placed into its main position again. It is thereby ensured that a pressure prevails in the pressure line 14 during the entire restoring phase until the swept volume of zero is reached. Thus, cavitation at the hydraulic machine is prevented. Furthermore, as described above, a high force acts on the stroke control element.

During the pivoting-back of the hydraulic machine 10, the pressure medium flow from the hydraulic accumulator 16 to the hydraulic machine decreases continuously, and reaches zero when the swept volume reaches zero. Accordingly, the pressure difference between the accumulator pressure and the pump pressure of the hydraulic machine 10 becomes progressively smaller, and reaches zero when the swept volume reaches zero. The pressure difference, which was kept constant during the starting process until the starting rotational speed was reached, between the accumulator pressure and the pressure set at the pressure-limiting valve is now selected such that the pressure value that is now kept constant at the pressure-limiting valve after the switching of the control valve 48 back into the main position lies below the accumulator pressure approximately by the pump-Δp when the hydraulic machine arrives at the swept volume of zero during the restoring movement. It is thereby achieved that the hydraulic machine 10 is not adjusted to the maximum positive swept volume, but remains below a positive swept volume of for example 45 percent of the maximum positive swept volume that would still leave the diesel engine at a standstill. If, when the swept volume of zero is reached, the difference between the pump pressure and the LS control pressure predefined by the setting of the pressure-limiting valve 62 is slightly smaller than the pump-Δp, the hydraulic machine 10 will, as a pump, with a small positive swept volume, deliver a certain flow rate in order to produce a difference, corresponding to the pump-Δp, between the pump pressure and the LS control pressure. If, when the swept volume of zero is approached, the difference between the pump pressure and the LS control pressure predefined by the setting of the pressure-limiting valve 62 is slightly smaller than the pump-ΔP, the hydraulic machine 10 will, as a motor, with a small negative swept volume, continue to draw in a certain flow rate in order to produce a difference, corresponding to the pump-Δp, between the pump pressure and the LS control pressure.

In any case, a state is attained in which the hydraulic machine 10, in the case of a small positive swept volume, delivers a pressure medium flow rate which is just such that internal leakage is compensated and a pump pressure is maintained which lies above, by the pump-Δp, the value predefined by the setting of the pressure-limiting valve 62. Subsequently, the setting of the pressure-limiting valve 62 is reduced in ramped fashion to a pressure value close to zero, and the pump pressure is correspondingly also reduced to a low standby pressure. Thereafter, the consumer shut-off valve 20 is placed into its pass-through position.

A hydrostatic drive according to the disclosure is in particular also primarily suitable, in the specific embodiment, for use in buses, rail vehicles or vehicles utilized by delivery services, that is to say in vehicles operated with frequent stopping and restarting.

LIST OF REFERENCE DESIGNATIONS

1 Steering hydraulics
2 Further consumer
4 Diesel engine
6 Crankshaft
8 Driveshaft
10 Hydraulic machine
12 Housing
13 Tank
14 Pressure line
16 High-pressure accumulator
18 Branching point
20 Consumer shut-off valve
22 Accumulator shut-off valve
26 First adjustment piston
28 Second adjustment piston
29 Restoring spring
30 Adjustment chamber
31 Valve arrangement
32 Chamber port
33 Adjustment chamber
36 LS signaling line
38 Shuttle valve
39 Pressure regulating valve
40 LS regulating valve
44 LS valve
45 Pressure delivery flow regulator
46 Port of 45
48 Control valve
52 Start-stop valve block
54 Shuttle valve
56 LS signaling line
62 Pressure-limiting valve
64 Nozzle
66 Port of 48
67 Line
75 Pressure sensor
76 Temperature sensor
80 Control unit
81 Electrical line
82 Electrical line
83 Electrical lines
T Tank port
P Pressure port
X LS port

What is claimed is:

1. A hydrostatic drive, comprising:
a hydraulic machine with an adjustable swept volume;
a hydraulic adjustment device configured to adjust the swept volume of the hydraulic machine from a maximum positive swept volume via a swept volume of zero to a maximum negative swept volume, the hydraulic machine is operable with positive swept volume as a pump and with negative swept volume as a motor;
at least one high-pressure accumulator from which the hydraulic machine is configured to be supplied with pressure medium via a pressure line for operation as a motor, the pressure line running between a pressure port of the hydraulic machine and the high-pressure accumulator;
an accumulator shut-off valve arranged in the pressure line and having a first position and a second position, a fluidic connection from the high-pressure accumulator to the hydraulic machine is open in the first position of the accumulator shut-off valve and is shut off in the second position of the accumulator shut-off valve; and
an electronic control unit, the accumulator shut-off valve actuable as a function of signals of the electronic control unit,
wherein, in the event of an adjustment of the hydraulic machine from a negative swept volume to a positive swept volume, the electronic control unit transmits a signal for switching the accumulator shut-off valve from the first position into the second position at such a time that the accumulator shut-off valve switches into the second position only in the presence of a swept volume of zero or a positive swept volume of the hydraulic machine.

2. The hydrostatic drive as claimed in claim 1, wherein the adjustment device comprises a first adjustment chamber, which adjoins an adjustment piston and for which an inflow, which effects an adjustment in the direction of maximum negative swept volume, and an outflow of pressure medium are controllable by a valve arrangement, a second adjustment chamber, which adjoins an adjustment piston and which is permanently fluidically connected to the pressure port and which is decreased in size in the event of an adjustment in the direction of maximum negative swept volume and is increased in size in the event of an adjustment in the direction of maximum positive swept volume, and a restoring spring, which acts in the direction of maximum positive swept volume.

3. The hydrostatic drive as claimed in claim 2, wherein the valve arrangement comprises a control valve by which, for an adjustment to negative swept volume, the first adjustment chamber is configured to be supplied with pressure medium from a pressure medium source independently of the pressure port of the hydraulic machine.

4. The hydrostatic drive as claimed in claim 3, wherein:
the valve arrangement comprises, for the operation of the hydraulic machine as a pump, a hydraulic regulating unit with a port,
the control valve is a 3/2-way valve with a first port, which is fluidically connected to the port of the hydraulic regulating unit, with a second port, which is fluidically connected to the pressure medium source, and with a third port, which is connected to the first adjustment chamber, and
the control valve has a first position, in which the third port is fluidically connected to the first port and the second port is shut off, and a second position, in which the third port is connected to the second port and the first port is shut off.

5. The hydrostatic drive as claimed in claim 4, wherein the hydraulic regulating unit comprises a load sensing regulating valve which is acted on, in the sense of a pressure medium inflow into the first adjustment chamber of the adjustment device, by the pressure at the pressure port, and in the sense of a pressure medium outflow out of the first adjustment chamber (30), by a regulating spring and an LS control pressure which prevails at an LS port, and wherein an LS control pressure is transmitted to the LS port of the load sensing regulating valve when the swept volume of the hydraulic machine is still negative.

6. The hydrostatic drive as claimed in claim 5, wherein the load sensing regulating valve is acted on with an LS control pressure already while the control valve is still situated in its second position.

7. The hydrostatic drive as claimed in claim 5, wherein the LS control pressure transmitted to the LS port is lower, approximately by the pressure equivalent of the regulating spring, than the pressure at the pressure port when the hydraulic machine reaches the swept volume of zero when pivoting back from the maximum negative swept volume, such that the hydraulic machine is adjusted beyond the swept volume of zero but not as far as the maximum positive swept volume.

8. The hydrostatic drive as claimed in claim 5, wherein:
an LS control pressure is transmitted to the LS port of the load sensing regulating valve when the control valve is still situated in its second position,
the LS control pressure initially follows the falling accumulator pressure with a fixed pressure difference below the pressure in the high-pressure accumulator, and
the LS control pressure is held constant when the control valve is switched from its second position into its first position.

9. The hydrostatic drive as claimed in claim 8, wherein the fixed pressure difference is approximately 1.6 times the pressure equivalent of the regulating spring of the load sensing regulating valve.

10. The hydrostatic drive as claimed in claim 1, wherein the hydraulic machine includes a sensor for the swept volume, and wherein, after the switching of the control valve from the second position into the first position, the level of an LS control pressure is determined in a manner dependent on the magnitude of the negative swept volume or of the change in the negative swept volume.

11. The hydrostatic drive as claimed in claim 1, wherein the hydraulic machine includes a sensor for the swept volume and wherein, after the switching of the control valve from the second position into the first position, the accumulator shut-off valve is switched from the first position into the second position in a manner dependent on the magnitude of the detected swept volume.

12. The hydrostatic drive as claimed in claim 1, wherein the hydrostatic drive is configured to start an internal combustion engine.

* * * * *